United States Patent
Bao et al.

(10) Patent No.: US 12,484,108 B2
(45) Date of Patent: Nov. 25, 2025

(54) METHOD FOR CONFIGURING DRX PARAMETER FOR SIDELINK, AND TERMINAL DEVICE

(71) Applicant: VIVO MOBILE COMMUNICATION CO., LTD., Guangdong (CN)

(72) Inventors: Wei Bao, Guangdong (CN); Xiaodong Yang, Guangdong (CN); Qian Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 372 days.

(21) Appl. No.: 17/675,692

(22) Filed: Feb. 18, 2022

(65) Prior Publication Data

US 2022/0174780 A1 Jun. 2, 2022

Related U.S. Application Data

(63) Continuation of application No. PCT/CN2020/108482, filed on Aug. 11, 2020.

(30) Foreign Application Priority Data

Aug. 22, 2019 (CN) .......................... 201910780101.8

(51) Int. Cl.
*H04W 76/28* (2018.01)
*H04W 52/02* (2009.01)
*H04W 76/14* (2018.01)

(52) U.S. Cl.
CPC ....... *H04W 76/28* (2018.02); *H04W 52/0248* (2013.01)

(58) Field of Classification Search
CPC ....... H04W 4/40–48; H04W 16/02–20; H04W 4/70–80
See application file for complete search history.

(56) References Cited

U.S. PATENT DOCUMENTS

| | | | |
|---|---|---|---|
| 2016/0366645 A1* | 12/2016 | Song | H04W 52/0229 |
| 2017/0289940 A1 | 10/2017 | Yang et al. | |
| 2018/0324694 A1* | 11/2018 | Uchiyama | H04W 76/28 |
| 2019/0053305 A1* | 2/2019 | Saiwai | H04L 5/0053 |
| 2019/0098689 A1 | 3/2019 | Wei et al. | |
| 2019/0174411 A1* | 6/2019 | Xu | H04W 52/0216 |

(Continued)

FOREIGN PATENT DOCUMENTS

| | | |
|---|---|---|
| CN | 103384394 A | 11/2013 |
| CN | 103582087 A | 2/2014 |

(Continued)

OTHER PUBLICATIONS

Discussion on sidelink resource allocation and configuration, 3GPP TSG RAN WG1 Meeting #90, R1-1712982, Aug. 21-25, 2017, Prague, Czechia. Source: Sony.

(Continued)

*Primary Examiner* — San Htun
(74) *Attorney, Agent, or Firm* — IP & T GROUP LLP (57) ABSTRACT

A method for configuring a DRX parameter for a Sidelink, and terminal devices includes: the first user equipment can send the second user equipment a control signaling carrying configuration information, where the configuration information is used to configure a DRX parameter.

17 Claims, 5 Drawing Sheets

(56) References Cited

U.S. PATENT DOCUMENTS

| | | | | |
|---|---|---|---|---|
| 2020/0037247 A1* | 1/2020 | Liao | ................. | H04W 52/0216 |
| 2020/0092685 A1* | 3/2020 | Fehrenbach | ........ | H04W 84/005 |
| 2021/0297842 A1 | 9/2021 | Shrivastava | | |

FOREIGN PATENT DOCUMENTS

| | | | |
|---|---|---|---|
| CN | 104869543 | A | 8/2015 |
| CN | 107306423 | A | 10/2017 |
| CN | 108307486 | A | 7/2018 |
| CN | 108347384 | A | 7/2018 |
| CN | 108616902 | A | 10/2018 |
| CN | 109413812 | A | 3/2019 |
| CN | 109479189 | A | 3/2019 |
| WO | 2018/064477 | A1 | 4/2018 |

OTHER PUBLICATIONS

International Search Report and Written Opinion of International Application No. PCT/CN2020/108482 issued by the Chinese Patent Office on Nov. 12, 2020.

First Office Action of Priority Application No. CN 201910780101.8 issued by the Chinese Patent Office on Mar. 9, 2021.

The Second Office Action of Priority Application No. CN 201910780101.8 issued by the Chinese Patent Office on Jul. 22, 2021.

The Third Office Action of Priority Application No. CN 201910780101.8 issued by the Chinese Patent Office on Jan. 18, 2022.

* cited by examiner

METHOD FOR CONFIGURING DRX PARAMETER FOR SIDELINK, AND TERMINAL DEVICE

CROSS REFERENCE TO RELATED APPLICATIONS

This application is a Bypass Continuation Application of PCT/CN2020/108482 filed on Aug. 11, 2020, which claims priority to Chinese Patent Application No. 201910780101.8 filed on Aug. 22, 2019, which are incorporated herein by reference in their entirety.

TECHNICAL FIELD

The present disclosure relates to the field of communications/terminals, and in particular to methods and apparatuses for configuring a discontinuous reception (DRX) parameter for a Sidelink, and terminal devices.

BACKGROUND

At present, a long term evolution (LTE) system supports a Sidelink, which is used to perform direct data transmission between user equipment (UE) without a base station.

SUMMARY

According to a first aspect, an embodiment of the present disclosure provides a method for configuring a DRX parameter for a Sidelink, applied to first user equipment and including:

sending second user equipment a control signaling carrying configuration information, where the configuration information is used to configure a DRX parameter.

According to a second aspect, an embodiment of the present disclosure further provides an apparatus for configuring a DRX parameter for a Sidelink, applied to first user equipment and including:

an information sending unit, configured to send second user equipment a control signaling carrying configuration information, where the configuration information is used to configure a DRX parameter.

According to a third aspect, an embodiment of the present disclosure further provides a terminal device, including a processor, a memory, and a computer program stored in the memory and executable on the processor, where when the computer program is executed by the processor, the steps of the method for configuring a DRX parameter for a Sidelink in the first aspect of the present disclosure are implemented.

According to a fourth aspect, an embodiment of the present disclosure further provides a method for configuring a DRX parameter for a Sidelink. The method is applied to second user equipment and includes:

receiving a control signaling sent by first user equipment, where the control signaling carries configuration information; and configuring a DRX parameter according to the configuration information carried in the control signaling.

According to a fifth aspect, an embodiment of the present disclosure further provides an apparatus for configuring a DRX parameter, applied to second user equipment and including:

an information receiving unit, configured to receive a control signaling sent by first user equipment, where the control signaling carries configuration information; and a parameter configuring unit, configured to configure a DRX parameter according to the configuration information carried in the control signaling.

According to a sixth aspect, an embodiment of the present disclosure further provides a terminal device, including a processor, a memory, and a computer program stored in the memory and executable on the processor, where when the computer program is executed by the processor, the steps of the method for configuring a DRX parameter for a Sidelink in the fourth aspect of the present disclosure are implemented.

BRIEF DESCRIPTION OF DRAWINGS

The accompanying drawings described herein are used to provide an understanding of the present disclosure and constitute a part of the present disclosure. The illustrative embodiments of the present disclosure and descriptions thereof are used to explain the present disclosure, and do not constitute any improper limitation on the present disclosure.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The embodiments in all aspects of the present disclosure can be applied to various communications systems, such as global system of mobile communication (GSM), a code division multiple access (CDMA) system, wideband code division multiple access (WCDMA), general packet radio service (GPRS), long term evolution (LTE)/long term evolution advanced (LTE-A), new radio (NR), and the like.

User equipment (UE), also referred to as a mobile terminal, a mobile user device, or the like, may communicate with one or more core networks through a radio access network (RAN). User equipment may be a terminal device, such as a mobile phone (or referred to as a "cellular" phone) and a computer with the terminal device. For example, the user equipment may be a portable, pocket-sized, handheld, computer built-in, or in-vehicle mobile apparatus, which exchanges language and/or data with the radio access network.

The base station may be a base transceiver station (BTS) in GSM or CDMA, a NodeB in WCDMA, an evolutional Node B (eNB, or e-NodeB) in LTE, or a 5G gNodeB, which is not limited in the embodiments of the present disclosure. However, for ease of description, the following embodiments use gNB as an example for description.

The long term evolution (LTE) system, which supports Sidelink communications, is used for direct data transmission between user equipment (UE) not through the base station. At present, the Sidelink communications mainly include broadcast, groupcast, and unicast forms.

Discontinuous reception (DRX) is configured in the user equipment to save power. The user equipment in DRX state does not need to connect and monitor a control channel, so that power is saved. However, if the user equipment does not monitor the control channel for a long time, time delay of data transmission will be increased once data is received. To give consideration to power saving and transmission delay, according to the time that the user equipment monitors the channel, the time that the user equipment monitors the channel may be divided into a DRX long period and a DRX short period. If a data volume of the user equipment is received frequently or a service is sensitive to time delay, the DRX short period can be configured. If the data volume of the user equipment is seldom received and insensitive to the time delay, a long DRX cycle may be configured.

DRX on duration monitoring timer: During running of the DRX on duration monitoring timer, the user equipment needs to continuously monitor a physical downlink control channel (PDCCH) control channel of the network.

DRX on duration transmitting timer: During running of the DRX on duration transmitting timer, scheduling/transmission of sent data is allowed.

DRX inactivity timer: the DRX inactivity timer starts at the first symbol after the user equipment receives data scheduling PDCCH signaling. During running of the DRX inactivity timer, the user equipment needs to continuously monitor a control channel or allow scheduling/transmission of sent data.

Hybrid automatic repeat request (HARQ) round-trip time (RTT) timer: duration of the HARQ RTT timer is a minimum time interval from the moment of HARQ feedback to the receipt of HARQ retransmission for this process. Only when data corresponding to the current process is not successfully decoded, the user equipment will start the timer at the first symbol after HARQ negative acknowledgement (NACK) feedback of the process. If only the HARQ RTT timer runs for the current terminal, the user equipment does not need to monitor the PDCCH control channel or allow the scheduling/transmission of sent data.

Retransmission timer: The retransmission timer is started at the next symbol after the HARQ RTT timer expires. During running of the retransmission timer, the user equipment monitors a control channel of a network or allows scheduling/transmission of sent data, and starts the retransmission timer if the scheduling/data for the process is received.

Usually, when the user equipment communicates with the base station, the base station is configured to dispose a power saving mechanism to the user equipment through a Uu interface using radio resource control (RRC) dedicated signaling or a system information block (SIB) message. Then, when the user equipment communicates with the base station, data can be sent and received according to the power saving mechanism, to save power for the user equipment. However, the manner for configuring a power saving parameter can't be applied to a Sidelink interface based on which user equipment communicates with each other through a Sidelink. Therefore, when the user equipment communicates with each other through the Sidelink, power cannot be saved for the user equipment.

The following describes in detail the embodiments of the present disclosure with reference to the accompanying drawings.

Figure 1:
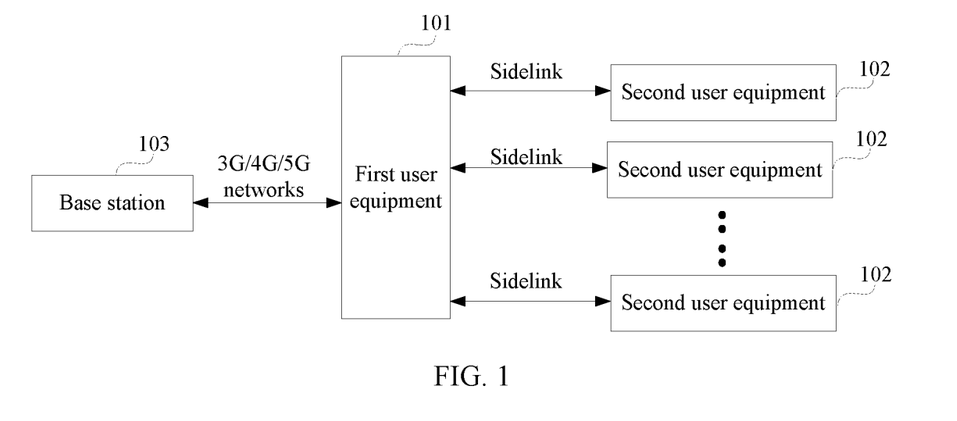
FIG. 1 is a schematic diagram of interaction between first user equipment and a base station and between the first user equipment and second user equipment according to an embodiment of the present disclosure.
Figure 2:
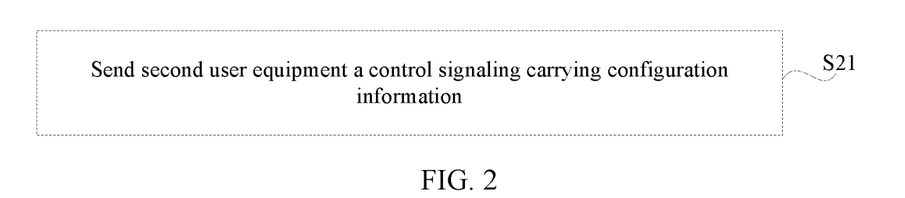
FIG. 2 is a flowchart of an embodiment of a method for configuring a DRX parameter for a Sidelink according to a first aspect of the present disclosure.

An embodiment in a first aspect of the present disclosure provides a method for configuring a DRX parameter for a Sidelink, which applies to first user equipment 101. In other words, the method can be performed by software or hardware installed in a terminal device. As shown in FIG. 1, the first user equipment 101 and second user equipment 102 communicate with each other through Sidelink (that is, the first user equipment 101 and the second user equipment 102 communicate with each other through Sidelink interfaces). The first user equipment 101 communicates with a base station 103 through the 3G/4G/5G networks. As shown in FIG. 2, the method may include the following steps.

S21: Send the second user equipment 102 a control signaling carrying configuration information.

It can be understood that the configuration information is sent by the first user equipment 101 through Sidelink based on the Sidelink interfaces. The configuration information is used to configure a DRX parameter, and the second user equipment 102 can complete configuration of the DRX parameter according to the received configuration information. The configured DRX parameter may include a DRX cycle, an offset, activation time and end time of a DRX on duration monitoring timer, activation time of a DRX on duration transmitting timer, activation time of a DRX inactivity timer, activation time of a HARQ RTT timer, activation time of a retransmission timer, and the like.

According to the method for configuring the DRX parameter for a Sidelink in the first aspect of the embodiment of the present disclosure, when the first user equipment 101 and the second user equipment 102 communicate with each other through a Sidelink, the first user equipment 101 can send the second user equipment 102 a control signaling carrying configuration information, where the configuration information is used to configure the DRX parameter. The second user equipment 102 receives the control signaling carrying the configuration information sent by the first user equipment 101, so as to complete configuration of the DRX parameter based on the configuration information. When data is sent and received between the first user equipment 101 and the second user equipment 102 through the Sidelink, under the control of a DRX mechanism formed based on the DRX parameter, power can be saved for both ends of communications.

For example, before S21, the method for configuring a DRX parameter for a Sidelink may further include: reporting a service parameter and power saving requirements to the base station 103 to which the first user equipment 101 belongs.

After receiving the service parameter and power-saving requirements, the base station can issue configuration information to the first user equipment according to the service parameter and power-saving requirements, or it does not issue the configuration information temporarily according to its own running state.

For example, before S21, the method for configuring a DRX parameter for a Sidelink may further include: receiving configuration information sent by the base station to which the first user equipment belongs.

For example, based on the above, the first user equipment 101 can obtain the configuration information in various manners, which are respectively illustrated as follows.

An example of the way in which the first user equipment 101 obtains the configuration information may be: the first user equipment 101 receives the configuration information periodically sent by the base station.

Figure 3:
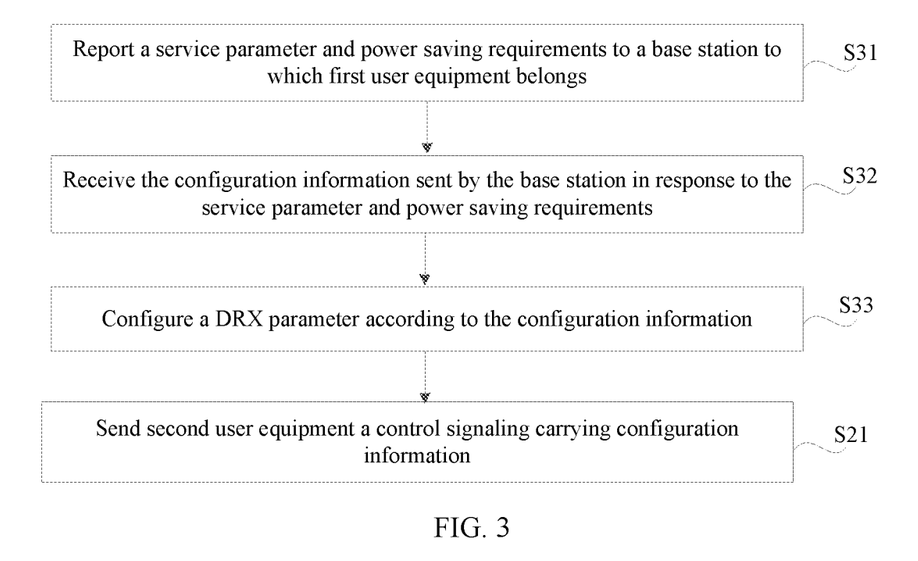
FIG. 3 is a flowchart of another embodiment of the method for configuring a DRX parameter for a Sidelink according to the first aspect of the present disclosure.

Another example of the way in which the first user equipment 101 obtains the configuration information may be: as shown in FIG. 3, before S21, the method for configuring a DRX parameter for a Sidelink further includes the following steps.

S31: Report a service parameter and power saving requirements to the base station 103 to which the first user equipment 101 belongs.

S32: Receive configuration information sent by the base station 103 in response to the report.

Another example of the way in which the first user equipment 101 obtains the configuration information may be: the first user equipment 101 generates the configuration information according to the service parameter and power saving requirements.

After S32, the method for configuring a DRX parameter for a Sidelink further includes the following step.

S33: Configure a DRX parameter according to the configuration information.

The configuration information may include a DRX parameter identifier, and S33 may include: specifying a group of DRX parameters from a configured DRX parameter set according to the DRX parameter identifier.

For example, the configured DRX parameter set is pre-written according to a protocol, generated or manually entered according to the service parameter and power saving requirements, or through SIB signaling broadcast of the base station 103, so that the first user equipment 101 and the second user equipment 102 can obtain a preset classic/common DRX parameter set applied to the Sidelink. For the way of obtaining the DRX parameter set through the SIB signaling broadcast of the base station 103, the first user equipment 101 and a plurality of second user equipment 102 may be covered by different local area networks (LANs). Therefore, to ensure that versions of the DRX parameter sets obtained by each of the first user equipment 101 and a plurality of second user equipment 102 are the same, the DRX parameter sets need to be synchronized among the base stations 103. For example, the DRX parameter sets may be synchronized among the base stations 103 by operation administration and maintenance (OAM) or interfaces among the base stations 103.

In addition, the configuration information may further include a set version identifier. Based on the above, a condition for performing S33 may be: an issued set version identifier being consistent with a pre-stored set version identifier.

It can be understood that the first user equipment 101 updated the base station 103 to which it belongs, and a version of a DRX parameter set issued by the current base station 103 is different from a version of a DRX parameter set issued by a previous base station 103. Therefore, the second user equipment 102 cannot determine a DRX parameter set from the DRX parameter sets through a DRX parameter identifier. Alternatively, when the base station 103 to which the first user equipment 101 belongs and the base station 103 to which the second user equipment 102 belongs do not synchronize the DRX parameter sets, versions of the DRX parameter sets stored by the two base stations are different. If the DRX parameter identifier is sent to the second user equipment 102, the second user equipment 102 also cannot determine the DRX parameter set from the DRX parameter sets through the DRX parameter identifier. Therefore, it is necessary to determine in advance that the issued set version identifier is consistent with the pre-stored set version identifier.

Figure 4:
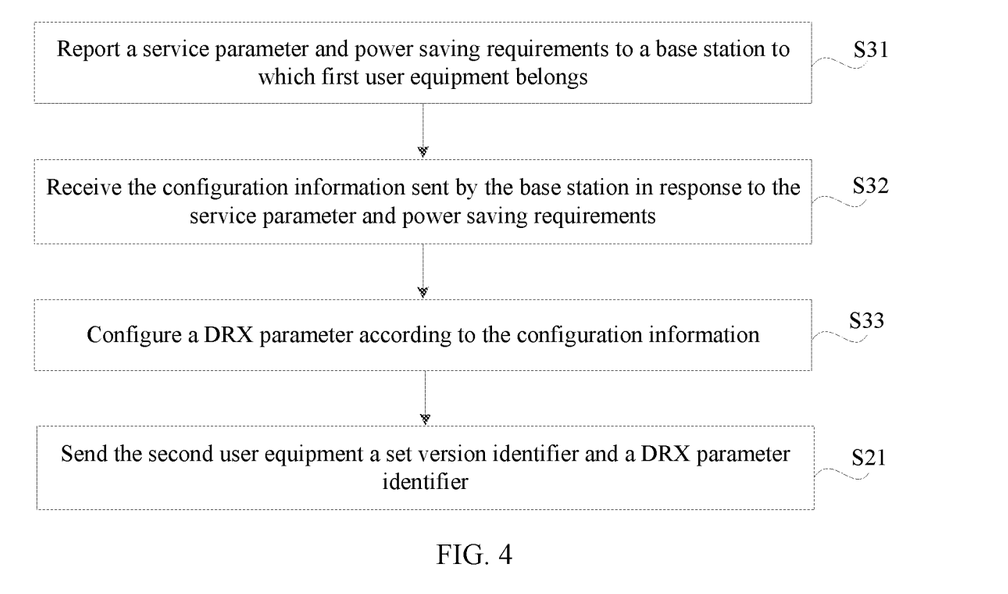
FIG. 4 is a flowchart of still another embodiment of the method for configuring a DRX parameter for a Sidelink according to the first aspect of the present disclosure.

For example, as shown in FIG. 4, S21 may include the following steps.

S41: Send a set version identifier and a DRX parameter identifier to second user equipment 102.

After receiving the set version identifier and DRX parameter identifier, the second user equipment 102 specifies a group of DRX parameters from a configured DRX parameter set according to the DRX parameter identifier when the set version identifier is consistent with the pre-stored version identifier.

The configuration information may further be DRX parameter data, and S33 may be: first user equipment 101 directly configures a DRX parameter according to the DRX parameter data.

The first user equipment 101 may further send the DRX parameter data to the second user equipment for configuration.

It should be noted that in this embodiment of the present disclosure, the DRX parameter further includes a priority rule for sending data. When both ends based on Sidelink communications have the demand of data transmission, it is difficult for the user equipment to receive and transmit data simultaneously due to limitations of transceiver hardware, interference, and other factors. In this case, data scheduling/transmission on both ends needs to be coordinated to ensure a data receiving effect and power saving. Therefore, which user equipment needs to send data first is determined according to the priority rule.

For example, there may be a plurality of the priority rules, which will be explained by several examples below.

An example of the priority rules is as follows: a sending priority of the first user equipment 101 relative to the second user equipment 102 is determined according to a pre-configured highest priority of at least one to-be-processed service parameter of the first user equipment 101 and a pre-configured highest priority level of at least one to-be-processed service parameter of the second user equipment 102.

The following is an example to illustrate the priority rules in this example.

The first user equipment 101 includes three service parameters A, B and C, with transmission priorities of 2, 2 and 3 respectively. The second user equipment 102 includes three service parameters D, E and F, with transmission priorities of 1, 2 and 3, respectively. It can be seen that the highest priority level of a to-be-processed service parameter of the first user equipment 101 is 2, and the highest priority level of a to-be-processed service parameter of the second user equipment 102 is 1. It can be seen that the highest priority of the second user equipment 102 is higher than that of the first user equipment 101.

Another example of the priority rules is as follows: according to a type of a target sending timer and a type of a target receiving timer that run, a sending priority of the first user equipment 101 relative to the second user equipment 102 is determined.

The following is an example to illustrate the priority rules in this example.

In the priority rules, a priority of a retransmission sending timer is higher than that of an on duration receiving timer. When an on duration transmitting timer and a retransmission receiving timer of the first user equipment 101 run simultaneously, an on duration receiving timer and a retransmission sending timer of the second user equipment 102 run simultaneously. In this case, the on duration transmitting timer of the first user equipment 101 and the retransmission receiving timer of the second user equipment 102 are turned off, and only the retransmission sending timer of the second user equipment 102 and the retransmission receiving timer of the first user equipment 101 run, that is, retransmission data is preferentially sent.

Still another example of the priority rules is as follows: a sending priority of the first user equipment 101 relative to the second user equipment 102 is determined according to time that the target sending timer and the target receiving timer that run point to.

The following is an example to illustrate the priority rules in this example.

For example, if a configured DRX cycle is 640 ms, a DRX mechanism stipulates that a sending priority of the first user equipment 101 is higher than that of the second user equipment within 0-320 ms of the DRX cycle, and the sending priority of the second user equipment 102 is higher than that of the first user equipment 101 within 320-640 ms of the DRX cycle. Therefore, within 0-320 ms of the DRX cycle, the first user equipment 101 can start the target sending timer according to the DRX mechanism, and the second user equipment 102 can start the target receiving timer according to the DRX mechanism, which determines that the first user equipment 101 sends data preferentially. Within 320-640 ms of the DRX cycle, the second user equipment 102 can start the target sending timer according to the DRX mechanism, and the first user equipment 101 can start the target receiving timer according to the DRX mechanism, which determines that the second user equipment 101 sends data preferentially.

For another example, if the configured DRX cycle is 640 ms, the DRX mechanism stipulates that a starting point of an on duration transmitting timer of the first user equipment 101 is 0 ms and a starting point of an on duration transmitting timer of the second user equipment 102 is 160 ms, a sending priority of the first user equipment 101 within 0-160 ms is higher than that of the second user equipment 102, and a sending priority of the second user equipment 102 within 160-640 ms is higher than that of the first user equipment 101. It can be understood that within 0-160 ms of the DRX cycle, the first user equipment 101 can turn on the on duration transmitting timer according to the DRX mechanism in a configuration time period from 0 ms (such as 0-20 ms or 0-40 ms, or the like) within 0-160 ms, and the second user equipment 102 can turn on the on duration monitoring timer according to the DRX mechanism in the configuration time period from 0 ms (such as 0-20 ms, 0-40 ms, or the like) within 0-160 ms, to determine that the first user equipment 101 sends data preferentially. Within 160-640 ms of the DRX cycle, the second user equipment 102 can turn on the on duration transmitting timer according to the DRX mechanism in a configuration time period from 160 ms (such as 160-180 ms or 160-200 ms) within 160-640 ms, and the first user equipment 101 can turn on the on duration monitoring timer according to the DRX mechanism in the configuration time period from 160 ms (such as 160-180 ms or 160-200 ms) within 160-640 ms, to determine that the second user equipment 102 sends data preferentially.

For example, S21 may include: sending the second user equipment 102 radio resource control (RRC) signaling carrying configuration information.

RRC signaling may be transmitted by default or by being carried in pre-configured signaling radio bearer (SRB), and configuration of the SRB includes a pre-configured SRB number. When the second user equipment 102 receives SRB data carrying the RRC signaling, the second user equipment can identify, through the SRB number, that the SRB data carries RRC configuration, and then interpret the data according to a format of RRC signaling, to obtain configuration information.

In addition, S21 may further include: repeatedly sending the second user equipment 102 a control signaling carrying the configuration information.

In particular, when the first user equipment 101 and a plurality of second user equipment 102 communicate with each other by groupcast/broadcast, because the groupcast/broadcast does not support a reply transmission mode, to ensure a transmission effect of RRC signaling, data transmission may be performed to the second user equipment 102 for many times to ensure that the second user equipment 102 successfully receives data.

Furthermore, for the second user equipment 102 newly using the groupcast, to obtain DRX configuration information in time, the first user equipment 101 can periodically send RRC signaling carrying the configuration information. When the second user equipment 102 fails to obtain the latest DRX configuration because it uses the groupcast late or misses the configuration information sent by the base station 103, the second user equipment 102 continuously monitors data scheduling/transmission. When the first user equipment 101 resends the RRX signaling carrying the configuration information next time, the configuration information may be synchronized, thus saving power during communication.

Figure 5:
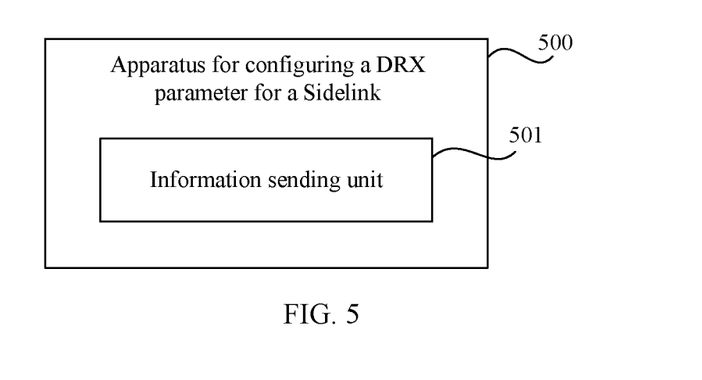
FIG. 5 is a functional unit block diagram of an embodiment of an apparatus for configuring a DRX parameter for a Sidelink according to a second aspect of the present disclosure.

A second aspect of the present disclosure further provides an apparatus for configuring a DRX parameter for a Sidelink, which is applied to first user equipment 101. It should be noted that the apparatus for configuring a DRX parameter for a Sidelink in the second aspect of the present disclosure may be configured to perform an operation of the method for configuring a DRX parameter for a Sidelink in the first aspect and generate a basically same technical effect. For the sake of conciseness, for those not described in this embodiment of the apparatus for configuring a DRX parameter for a Sidelink, please refer to corresponding contents in the foregoing embodiment of the method for configuring a DRX parameter for a Sidelink. As shown in FIG. 1, the first user equipment 101 and second user equipment 102 communicate with each other through Sidelink (that is, the first user equipment 101 and the second user equipment 102 communicate with each other through Sidelink interfaces). The first user equipment 101 communicates with a base station 103 through the 3G/4G/5G networks. FIG. 5 shows a functional unit block diagram of an embodiment of an apparatus for configuring a DRX parameter for a Sidelink according to a second aspect of the present disclosure. As shown in FIG. 5, an apparatus for configuring a DRX parameter for a Sidelink 500 includes:

an information sending unit 501, configured to send second user equipment 102 a control signaling carrying configuration information, where the configuration information is used to configure a DRX parameter.

For the apparatus for configuring a DRX parameter for a Sidelink 500 according to this embodiment of the present disclosure, when first user equipment 101 and the second user equipment 102 communicate with each other through a Sidelink, the first user equipment 101 can send the second user equipment 102 a control signaling carrying configuration information, where the configuration information is used to configure the DRX parameter. The second user equipment 102 receives the control signaling carrying the configuration information sent by the first user equipment 101, so as to complete configuration of the DRX parameter based on the configuration information. When data is sent and received between the first user equipment 101 and the second user equipment 102 through the Sidelink, under the control of a DRX mechanism formed based on the DRX parameter, power can be saved for both ends of communications.

For example, the information sending unit 501 is further configured to report a service parameter and power saving requirements to a base station 103 to which the first user equipment 101 belongs.

Figure 6:
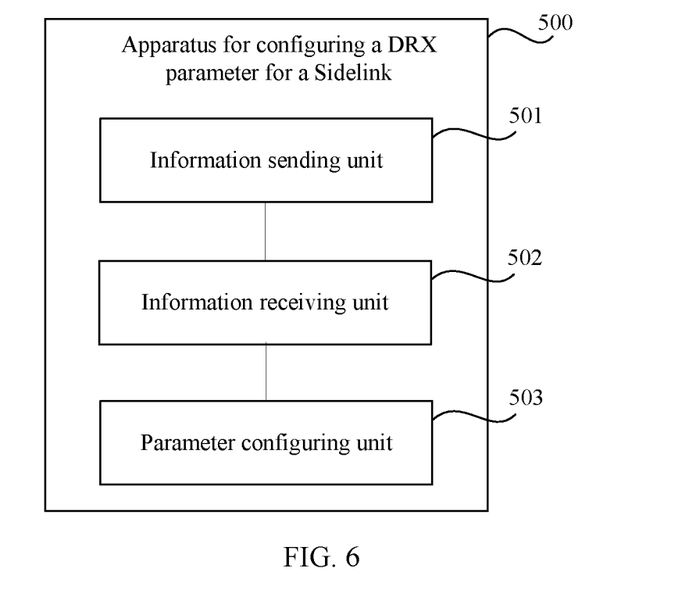
FIG. 6 is a functional unit block diagram of another embodiment of the apparatus for configuring a DRX parameter for a Sidelink according to the second aspect of the present disclosure.

For example, as shown in FIG. 6, the apparatus 500 for configuring a DRX parameter for a Sidelink may further include an information receiving unit 502, where the information receiving unit is configured to receive configuration information sent by a base station 103 to which first user equipment 101 belongs.

For example, based on the above, the first user equipment 101 can obtain the configuration information in various manners, which are respectively illustrated as follows.

For example, the information receiving unit 502 may be configured to receive the configuration information periodically sent by the base station.

For another example, an information receiving unit 501 may be configured to report a service parameter and power saving requirements to the base station 103 to which the first user equipment 101 belongs. The information receiving unit 502 is configured to receive, in response to the report, configuration information sent by the base station 103.

For still another example, the first user equipment 101 can generate the configuration information according to the service parameter and power saving requirements.

For example, the configuration information may include a DRX parameter identifier. As shown in FIG. 6, the apparatus 500 for configuring a DRX parameter for a Sidelink may further include a parameter configuring unit 503, where the parameter configuring unit is configured to specify a group of DRX parameters from a configured DRX parameter set according to the DRX parameter identifier.

For example, the configured DRX parameter set is pre-written in a protocol according to standard requirements, generated or manually entered according to a service parameter and power saving requirements, or through the SIB signaling broadcast of the base station 103, so that the first user equipment 101 and the second user equipment 102 can obtain a preset classic/common DRX parameter set applied to a Sidelink. For the way of obtaining the DRX parameter set through the SIB signaling broadcast of base station 103, the first user equipment 101 and a plurality of second user equipment 102 may be covered by LANs. Therefore, to ensure that versions of the DRX parameter sets obtained by each of the first user equipment 101 and a plurality of second user equipment 102 are the same, it is necessary to synchronize the DRX parameter sets among the base stations 103. For example, the DRX parameter sets may be synchronized among the base stations 103 by operation administration and maintenance (OAM) or interfaces among the base stations 103.

In addition, the configuration information may further include a set version identifier. Based on the above, the condition for the parameter configuring unit 503 to perform a function is that an issued set version identifier is consistent with a pre-stored set version identifier.

It can be understood that the first user equipment 101 updated the base station 103 to which it belongs, and a version of a DRX parameter set issued by the current base station 103 is different from a version of a DRX parameter set issued by a previous base station 103. Therefore, the second user equipment 102 cannot determine a DRX parameter set from the DRX parameter sets through a DRX parameter identifier. Alternatively, when the base station 103 to which the first user equipment 101 belongs and the base station 103 to which the second user equipment 102 belongs do not synchronize the DRX parameter sets, versions of the DRX parameter sets stored by the two base stations are different. If the DRX parameter identifier is sent to the second user equipment 102, the second user equipment 102 also cannot determine the DRX parameter set from the DRX parameter sets through the DRX parameter identifier. Therefore, it is necessary to determine in advance that the issued set version identifier is consistent with the pre-stored set version identifier.

For example, the information sending unit 501 may further be configured to send the second user equipment 102 the set version identifier and the DRX parameter identifier.

After receiving the set version identifier and DRX parameter identifier, the second user equipment 102 specifies a group of DRX parameters from a configured DRX parameter set according to the DRX parameter identifier when the set version identifier is consistent with the pre-stored version identifier.

For example, the configuration information may further be DRX parameter data, and the parameter configuring unit 503 may further be configured to directly configure a DRX parameter according to the DRX parameter data.

The first user equipment 101 may further send the DRX parameter data to the second user equipment 102 for configuration.

It should be noted that the configured DRX parameter includes a priority rule for sending data.

For example, there may be a plurality of the priority rules, which will be explained by several examples below.

An example of the priority rules is as follows: a sending priority of the first user equipment 101 relative to the second user equipment 102 is determined according to a pre-configured highest priority of at least one to-be-processed service parameter of the first user equipment 101 and a pre-configured highest priority level of at least one to-be-processed service parameter of the second user equipment 102.

Another example of the priority rules is as follows: a sending priority of the first user equipment 101 relative to the second user equipment 102 is determined according to types of a target sending timer and a target receiving timer that run.

Another example of the priority rules is as follows: a sending priority of the first user equipment 101 relative to the second user equipment 102 is determined according to time that the target sending timer and the target receiving timer that run point to.

For example, the information sending unit 501 is configured to send the second user equipment 102 radio resource control (RRC) signaling carrying configuration information.

For example, the information sending unit 501 is configured to repeatedly send the second user equipment 102 a control signaling carrying configuration information.

Figure 7:
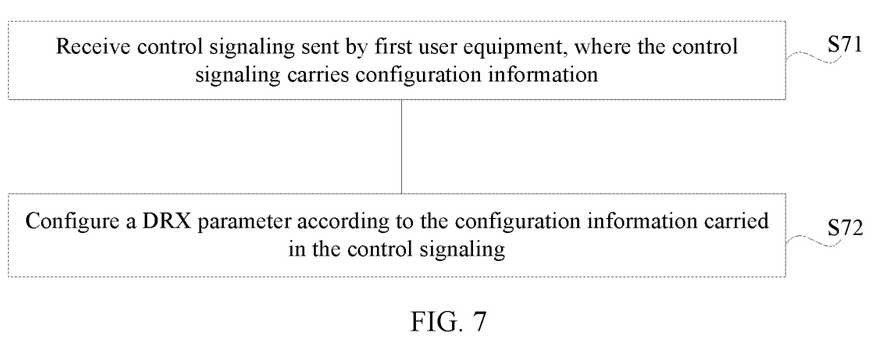
FIG. 7 is a flowchart of an embodiment of a method for configuring a DRX parameter for a Sidelink according to a fourth aspect of the present disclosure.

A fourth aspect of the present disclosure further provides a method for configuring a DRX parameter for a Sidelink, which is applied to second user equipment 102. As shown in FIG. 1, the first user equipment 101 and second user equipment 102 communicate with each other through Sidelink (that is, the first user equipment 101 and the second user equipment 102 communicate with each other through Sidelink interfaces). The first user equipment 101 communicates with a base station 103 through the 3G/4G/5G networks. FIG. 7 shows a flowchart of an embodiment of a method for configuring a DRX parameter for a Sidelink according to a fourth aspect of the present disclosure. As shown in FIG. 7, the method includes the following steps.

S71: Receive a control signaling sent by first user equipment 101, where the control signaling carries configuration information; and S72: Configure a DRX parameter according to the configuration information carried in the control signaling.

It can be understood that the configuration information is sent by second user equipment 102 through a Sidelink based on a Sidelink interface. The configuration information is used to configure a DRX parameter, and the second user equipment 102 can complete configuration of the DRX parameter according to the received configuration information. The configured DRX parameter may include a DRX cycle, an offset, activation time and end time of a DRX on duration monitoring timer, activation time of a DRX on duration transmitting timer, activation time of a DRX inactivity timer, activation time of a HARQ RTT timer, activation time of a retransmission timer, and the like.

According to the method for configuring the DRX parameter for a Sidelink in the fourth aspect of the embodiment of the present disclosure, when the first user equipment 101 and the second user equipment 102 communicate with each other through a Sidelink, the second user equipment 102 can receive a control signaling carrying configuration information and sent by the first user equipment 101, where the configuration information is used to configure a DRX parameter; and the second user equipment 102 receives the control signaling carrying the configuration information and sent by the first user equipment 101, so as to complete configuration of the DRX parameter based on the configuration information. When data is sent and received between the first user equipment 101 and the second user equipment 102 through the Sidelink, under the control of a DRX mechanism formed based on the DRX parameter, power can be saved for both ends of communications.

For example, ways for configuring the DRX parameter include but are not limited to the following examples.

Figure 8:
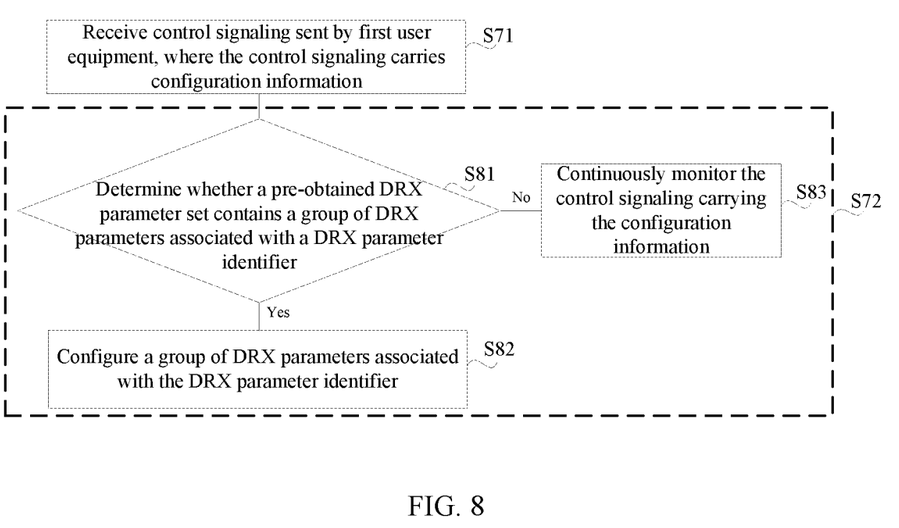
FIG. 8 is a flowchart of another embodiment of the method for configuring a DRX parameter for a Sidelink according to the fourth aspect of the present disclosure.

For example, the configuration information includes a DRX parameter identifier. As shown in FIG. 8, S72 includes the following steps.

S81: Determine whether a pre-obtained DRX parameter set contains a group of DRX parameters associated with a DRX parameter identifier. If yes, perform S82; if no, perform S83;

S82: Configure a group of DRX parameters associated with the DRX parameter identifier.

For example, the first user equipment 101 can report a service parameter and power saving requirements to the base station 103, and receive the DRX parameter identifier determined and sent by the base station 103 according to the service parameter and power saving requirements (or directly and periodically receive the DRX parameter identifier sent by the base station 103 or generated according to the service parameter and power saving requirements); and specify a group of DRX parameters from a configured DRX parameter set according to the DRX parameter identifier. Then, the first user equipment sends the DRX parameter identifier to the second user equipment 102. If the second user equipment 102 recognizes that the pre-obtained DRX parameter set contains a group of DRX parameters associated with the DRX parameter identifier, it configures a group of DRX parameters associated with the DRX parameter identifier.

For example, the configured DRX parameter set is pre-written in a protocol according to standard requirements, generated or manually entered according to a service parameter and power saving requirements, or through the SIB signaling broadcast of the base station 103, so that the first user equipment 101 and the second user equipment 102 can obtain a classic/common DRX parameter set applied to a Sidelink. For the way of obtaining the DRX parameter set through the SIB signaling broadcast of the base station 103, the first user equipment 101 and a plurality of second user equipment 102 may be covered by different LANs. Therefore, to ensure DRX parameter sets obtained by each of the first user equipment 101 and the plurality of second user equipment 102 are the same, DRX parameter sets need to be synchronized among the base stations 103. For example, the DRX parameter sets may be synchronized among the base stations 103 by operation administration and maintenance (OAM) or interfaces among the base stations 103.

For example, for example, the configuration information further includes a set version identifier, and a condition for performing S72 may be: a received version identifier being consistent with a pre-stored version identifier.

It can be understood that if the first user equipment 101 updated the base station 103 to which it belongs, and a version of a DRX parameter set issued by the current base station 103 is different from a version of a DRX parameter set issued by a previous base station 103, the second user equipment 102 cannot determine a DRX parameter set from the DRX parameter sets through the DRX parameter identifier. Alternatively, when the base station 103 to which the first user equipment 101 belongs and the base station 103 to which the second user equipment 102 belongs does not synchronize the DRX parameter sets, versions of the DRX parameter sets stored by the two base stations are different. The DRX parameter identifier is sent to the second user equipment 102, but the second user equipment 102 cannot determine the DRX parameter set from the DRX parameter sets through the DRX parameter identifier. Therefore, it is necessary to determine in advance that the issued set version identifier is consistent with the pre-stored set version identifier.

S72 may further include the following step.

S83: Continuously monitor the control signaling carrying the configuration information.

In addition, the method may further include: removing the DRX parameter set if the time for storing the DRX parameter set exceeds a set time.

For example, if the time for storing the DRX parameter set exceeds the set time, a currently configured DRX parameter may not match a current service parameter and power saving requirements. Therefore, the DRX parameter set that expires needs to be removed, so that a new received DRX parameter can be configured, thereby completing update of DRX parameter configuration.

For another example, during configuration of the DRX parameter, configuration information is DRX parameter data, and S72 includes: configuring a DRX parameter according to DRX parameter data.

In addition, the DRX parameter includes a priority rule for sending data.

When both ends based on Sidelink communications have the demand of data transmission, it is difficult for the user equipment to receive and transmit data simultaneously due to limitations of transceiver hardware, interference, and other factors. In this case, data scheduling/transmission on both ends needs to be coordinated to ensure a data receiving effect and power saving. Therefore, which user equipment needs to send data first is determined according to the priority rule.

For example, there may be a plurality of the priority rules, which will be explained by many examples below.

An example of the priority rules is as follows: a sending priority of the first user equipment 101 relative to the second user equipment 102 is determined according to a pre-configured highest priority of at least one to-be-processed service parameter of the first user equipment 101 and a pre-configured highest priority level of at least one to-be-processed service parameter of the second user equipment 102.

The following is an example to illustrate the priority rules in this example.

The first user equipment 101 includes three service parameters A, B and C, with transmission priorities of 2, 2 and 3 respectively. The second user equipment 102 includes three service parameters D, E and F, with transmission priorities of 1, 2 and 3, respectively. It can be seen that the highest priority level of a to-be-processed service parameter of the first user equipment 101 is 2, and the highest priority level of a to-be-processed service parameter of the second user equipment 102 is 1. It can be seen that the highest priority of the second user equipment 102 is higher than that of the first user equipment 101.

Another example of the priority rules is as follows: a sending priority of the first user equipment 101 relative to the second user equipment 102 is determined according to types of a target sending timer and a target receiving timer that run.

The following is an example to illustrate the priority rules in this example.

In the priority rules, a priority of a retransmission sending timer is higher than that of an on duration receiving timer. When an on duration transmitting timer and a retransmission receiving timer of the first user equipment 101 run simultaneously, an on duration receiving timer and a retransmission sending timer of the second user equipment 102 run simultaneously. In this case, the on duration transmitting timer of the first user equipment 101 and the retransmission receiving timer of the second user equipment 102 are turned off, and only the retransmission sending timer of the second user equipment 102 and the retransmission receiving timer of the first user equipment 101 run, that is, retransmission data is preferentially sent.

Still another example of the priority rules is as follows: a sending priority of the first user equipment 101 relative to the second user equipment 102 is determined according to time that the target sending timer and the target receiving timer that run point to.

The following is an example to illustrate the priority rules in this example.

For example, if a configured DRX cycle is 640 ms, a DRX mechanism stipulates that a sending priority of the first user equipment 101 is higher than that of the second user equipment within 0-320 ms of the DRX cycle, and the sending priority of the second user equipment 102 is higher than that of the first user equipment 101 within 320-640 ms of the DRX cycle. Therefore, within 0-320 ms of the DRX cycle, the first user equipment 101 can start the target sending timer according to the DRX mechanism, and the second user equipment 102 can start the target receiving timer according to the DRX mechanism, which determines that the first user equipment 101 sends data preferentially. Within 320-640 ms of the DRX cycle, the second user equipment 102 can start the target sending timer according to the DRX mechanism, and the first user equipment 101 can start the target receiving timer according to the DRX mechanism, which determines that the second user equipment 101 sends data preferentially.

For another example, if the configured DRX cycle is 640 ms, the DRX mechanism stipulates that a starting point of an on duration transmitting timer of the first user equipment 101 is 0 ms and a starting point of an on duration transmitting timer of the second user equipment 102 is 160 ms, a sending priority of the first user equipment 101 within 0-160 ms is higher than that of the second user equipment 102, and a sending priority of the second user equipment 102 within 160-640 ms is higher than that of the first user equipment 101. It can be understood that within 0-160 ms of the DRX cycle, the first user equipment 101 can turn on the on duration transmitting timer according to the DRX mechanism in a configuration time period from 0 ms (such as 0-20 ms or 0-40 ms, or the like) within 0-160 ms, and the second user equipment 102 can turn on the on duration monitoring timer according to the DRX mechanism in the configuration time period from 0 ms (such as 0-20 ms, 0-40 ms, or the like) within 0-160 ms, to determine that the first user equipment 101 sends data preferentially. Within 160-640 ms of the DRX cycle, the second user equipment 102 can turn on the on duration transmitting timer according to the DRX mechanism in a configuration time period from 160 ms (such as 160-180 ms or 160-200 ms) within 160-640 ms, and the first user equipment 101 can turn on the on duration monitoring timer according to the DRX mechanism in the configuration time period from 160 ms (such as 160-180 ms or 160-200 ms) within 160-640 ms, to determine that the second user equipment 102 sends data preferentially.

For example, S71 may include: receiving radio resource control (RRC) signaling carrying configuration information and sent by the first user equipment 101.

RRC signaling may be transmitted by default or by being carried in pre-configured SRB, and configuration of the SRB includes a pre-configured SRB number. When the second user equipment 102 receives SRB data carrying the RRC signaling, the second user equipment can identify, through the SRB number, that the SRB data carries RRC configuration, and then interpret the data according to a format of RRC signaling, to obtain configuration information.

For example, S71 may include: repeatedly receiving the control signaling sent by the first user equipment 101.

When the first user equipment 101 and a plurality of second user equipment 102 communicate with each other by groupcast/broadcast, because the groupcast/broadcast does not support a reply transmission mode, to ensure a transmission effect of RRC signaling, data transmission may be performed to the second user equipment 102 for many times to ensure that the second user equipment 102 successfully receives data.

For the second user equipment 102 newly using the groupcast, to obtain DRX configuration information in time, the first user equipment 101 can periodically send RRC signaling carrying the configuration information. When the second user equipment 102 fails to obtain the latest DRX configuration because it uses the groupcast late or misses the configuration information sent by the base station 103, the second user equipment 102 performs continuous monitoring. When the first user equipment 101 resends the RRX signaling carrying the configuration information next time, the configuration information may be synchronized, thus saving power during communication.

Figure 9:
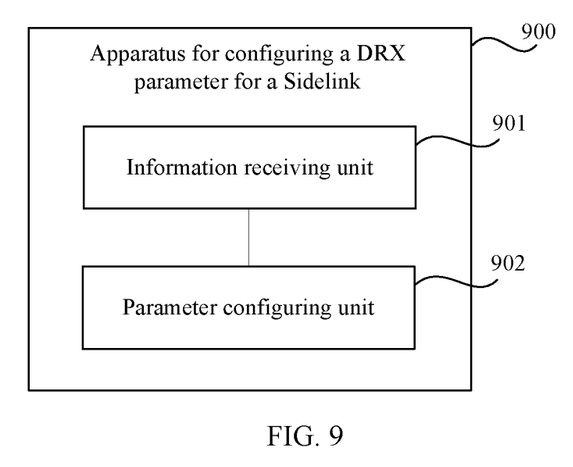
FIG. 9 is a functional unit block diagram of an embodiment of an apparatus for configuring a DRX parameter for a Sidelink according to a fifth aspect of the present disclosure.

A fifth aspect of the present disclosure further provides an apparatus for configuring a DRX parameter for a Sidelink, which applies to second user equipment 102. It should be noted that the apparatus for configuring a DRX parameter for a Sidelink in the fifth aspect of the present disclosure may be configured to perform an operation of the method for configuring a DRX parameter for a Sidelink in the fourth aspect and generate a basically same technical effect. For the sake of conciseness, for those not described in this embodiment of the apparatus for configuring a DRX parameter for a Sidelink, please refer to corresponding contents in the foregoing embodiment of the method for configuring a DRX parameter for a Sidelink. As shown in FIG. 1, second user equipment 102 communicates with first user equipment 101 through a Sidelink (that is, the second user equipment 102 communicates with the first user equipment 101 through a Sidelink interface). The first user equipment 101 communicates with a base station 103 through the 3G/4G/5G networks. FIG. 9 shows a functional unit block diagram of an embodiment of an apparatus for configuring a DRX parameter for a Sidelink according to a fifth aspect of the present disclosure. As shown in FIG. 9, an apparatus 900 includes:

- an information receiving unit 901, configured to receive a control signaling sent by first user equipment 101, where the control signaling carries configuration information; and
- a parameter configuring unit 902, configured to configure a DRX parameter according to the configuration information carried in the control signaling.

For the apparatus 900 for configuring the DRX parameter for a Sidelink according to this embodiment of the present disclosure, when the first user equipment 101 and the second user equipment 102 communicate with each other through a Sidelink, the second user equipment 102 can receive a control signaling carrying configuration information and sent by the first user equipment 101, where the configuration information is used to configure a DRX parameter; and the second user equipment 102 receives the control signaling carrying the configuration information and sent by the first user equipment 101, so as to complete configuration of the DRX parameter based on the configuration information. When data is sent and received between the first user equipment 101 and the second user equipment 102 through the Sidelink, under the control of a DRX mechanism formed based on the DRX parameter, power can be saved for both ends of communications.

For example, the configuration information may include a DRX parameter identifier, and the parameter configuring unit 902 is configured to configure a group of DRX parameters associated with the DRX parameter identifier if the pre-obtained DRX parameter set contains a group of DRX parameters associated with the DRX parameter identifier.

For example, the configuration information further includes a set version identifier. If a pre-obtained DRX parameter set contains a group of DRX parameters associated with a DRX parameter identifier, an execution condition for configuring the group of DRX parameters associated with the DRX parameter identifier is: a received version identifier being consistent with a pre-stored version identifier.

For example, the information receiving unit 901 is configured to continuously monitor the control signaling carrying the configuration information if a pre-obtained DRX parameter set does not contain a group of DRX parameters associated with the DRX parameter identifier.

Figure 10:
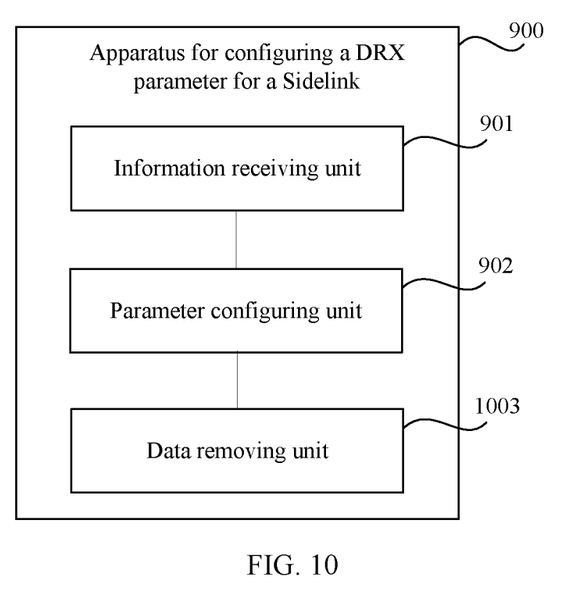
FIG. 10 is a functional unit block diagram of another embodiment of an apparatus for configuring a DRX parameter for a Sidelink according to the fifth aspect of the present disclosure.

For example, as shown in FIG. 10, the apparatus 900 may further include: a data removing unit 903, configured to remove a DRX parameter set if the time for storing the DRX parameter set exceeds a set time.

For example, the configuration information may be DRX parameter data. For example, the parameter configuring unit 902 is configured to configure the DRX parameter according to the DRX parameter data.

It should be noted that the configured DRX parameter may further include a priority rule for sending data.

For example, there may be a plurality of the priority rules, which will be explained by several examples below.

An example of the priority rules is as follows: a sending priority of the first user equipment 101 relative to the second user equipment 102 is determined according to a pre-configured highest priority of at least one to-be-processed service parameter of the first user equipment 101 and a pre-configured highest priority level of at least one to-be-processed service parameter of the second user equipment 102.

Another example of the priority rules is as follows: a sending priority of the first user equipment 101 relative to the second user equipment 102 is determined according to types of a target sending timer and a target receiving timer that run.

Still another example of the priority rules is as follows: a sending priority of the first user equipment 101 relative to the second user equipment 102 is determined according to time that the target sending timer and the target receiving timer that run point to.

For example, the information receiving unit 901 is configured to receive radio resource control (RRC) signaling carrying configuration information and sent by the first user equipment 101.

For example, the information receiving unit 901 is configured to repeatedly receive the control signaling sent by the first user equipment 101.

According to a third aspect of the present disclosure, a terminal device is further provided, including a processor, a memory, and a computer program stored in the memory and executable on the processor, where when the computer program is executed by the processor, the steps of any of the embodiments of the method for configuring a DRX parameter for a Sidelink in the first aspect of the present disclosure are implemented.

According to a sixth aspect of the present disclosure, a terminal device is further provided, including a processor, a memory, and a computer program stored in the memory and executable on the processor, where when the computer program is executed by the processor, the steps of any of the embodiments of the method for configuring a DRX parameter for a Sidelink in the fourth aspect of the present disclosure are implemented.

Figure 11:
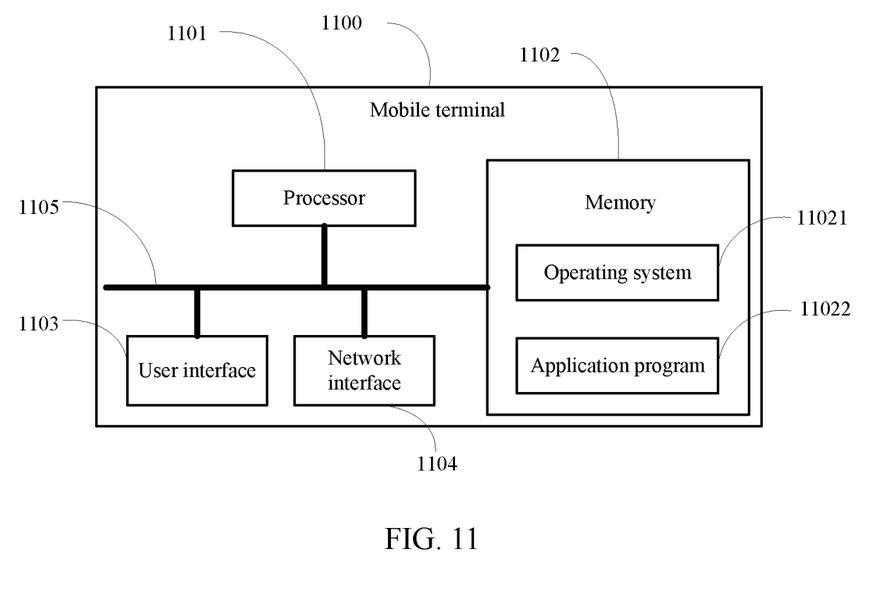
FIG. 11 is a circuit connection block diagram of an embodiment of a terminal device according to the present disclosure.

FIG. 11 is a structural block diagram of an embodiment of a terminal device according to a third or sixth aspect of the present disclosure. As shown in FIG. 11, the terminal device 1100 includes: at least one processor 1101, a memory 1102, at least one network interface 1104, and a user interface 1103. The components in the terminal device 1100 are coupled together through a bus system 1105. It can be understood that the bus system 1105 is configured to implement a connection and communication between these components. In addition to a data bus, the bus system 1105 further includes a power bus, a control bus, and a status signal bus. However, for clarity of description, various buses are marked as the bus system 1105 in FIG. 11.

The user interface 1103 may include a display, a keyboard, or a clicking device (for example, a mouse, a trackball, a touch panel, or a touchscreen).

It can be understood that the memory 1102 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1102 in the system and the method that are described in the embodiments of the present disclosure is intended to include but is not limited to these and any other suitable types of memories.

In some implementations, the memory 1102 stores the following elements: executable modules or data structures, a subset thereof, or an extended set thereof: an operating system 11021 and an application 11022.

The operating system 11021 may include various system programs, for example, a framework layer, a kernel library layer, and a driver layer. The operating system is configured to implement various basic services and process hardware-based tasks. The application program 11022 includes various application programs, for example, a media player, a browser, and the like, and is configured to implement various application services. A program for implementing the method in the embodiments of the present disclosure may be included in the application 11022.

In this embodiment of the present disclosure, the terminal device 1100 further includes a computer program stored in the memory and executable on the processor, and when the computer program is executed by the processor 1101, the following steps are implemented:

sending second user equipment a control signaling carrying configuration information, where the configuration information is used to configure a DRX parameter.

In another embodiment of the present disclosure, the terminal device 1100 further includes a computer program stored in the memory and executable on the processor, and when the computer program is executed by the processor 1101, the following steps are implemented:

receiving a control signaling sent by first user equipment, where the control signaling carries configuration information, and configuring a DRX parameter according to the configuration information carried by the control signaling.

The method disclosed in the embodiments of the present disclosure may be applied to the processor 1101 or implemented by the processor 1101. The processor 1101 may be an integrated circuit chip having a signal processing capability. During implementation, the steps of the foregoing method may be completed by hardware integrated logic circuits in the processor 1101 or instructions in a form of software. The processor 1101 may be a general purpose processor, a digital signal processor (DSP), an application specific integrated circuit (ASIC), a field programmable gate array (FPGA), another programmable logic device, a discrete gate, a transistor logic device, or a discrete hardware component. The processor may implement or perform the methods, the steps, and logical block diagrams that are disclosed in the embodiments of the present disclosure. The general-purpose processor may be a microprocessor or may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 1102, and the processor 1101 reads information from the memory 1102 and completes the steps of the foregoing method in combination with hardware of the processor. For example, the non-transitory computer-readable storage medium stores a computer program, and when the computer program is executed by the processor 1101, the steps of any of the embodiments of the method for configuring a DRX parameter for a Sidelink in the first or fourth aspect of the present disclosure are implemented.

Therefore, the terminal device 1100 can implement each process and achieve each effect implemented by the terminal device in the foregoing embodiment. To avoid repetition, details are not described herein again.

Various aspects of the present disclosure are described with reference to the flowcharts and/or block diagrams of the method, the apparatus (system) and the computer program product in the embodiments of the present disclosure. It can be understood that the embodiments described in the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software codes may be stored in the memory and executed by the processor. The memory may be implemented in the processor or outside the processor.

The present disclosure further provides a non-transitory computer readable storage medium. The non-transitory computer readable storage medium stores a computer program, and when the computer program is executed by a processor, the processes of any of the foregoing methods for configuring a DRX parameter for a Sidelink in the first or fourth aspect are implemented, and the same technical effect can be achieved. To avoid repetition, details are not described herein again. For example, the non-transitory computer-readable storage medium includes a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude presence of another same element in a process, method, article, or apparatus that includes the element.

It should also be noted that in the exemplary embodiments mentioned in the present disclosure, some methods or systems are described based on a series of steps or apparatuses. However, the present disclosure is not limited to the sequence of the above steps, that is, the steps can be executed in the order mentioned in an embodiment, or different from the order in the embodiment, or several steps can be executed simultaneously.

According to the foregoing descriptions of the implementations, a person skilled in the art may clearly understand that the method in the foregoing embodiments may be implemented by using software plus a required universal hardware platform, or certainly may be implemented by using hardware or software. However, in many cases, the former is a better implementation. Based on such an understanding, the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

What is claimed is:

1. A method for configuring a DRX parameter for a Sidelink, performed by a first user equipment and comprising:
receiving configuration information sent by a base station to which the first user equipment belongs, wherein the configuration information comprises a discontinuous reception (DRX) parameter identifier;
specifying a group of DRX parameters from a configured DRX parameter set according to the DRX parameter identifier; and
sending a second user equipment a control signaling carrying the configuration information, wherein the configuration information is used to configure a DRX parameter;
wherein before the sending a second user equipment a control signaling carrying the configuration information, the method further comprises:
reporting a service parameter or power saving requirements to a base station to which the first user equipment belongs;
wherein the configuration information further comprises a set version identifier, and an execution condition for the specifying the group of DRX parameters from the configured DRX parameter set according to the DRX parameter identifier is:
an issued set version identifier being consistent with a pre-stored set version identifier.

2. The method according to claim 1, wherein the configured DRX parameter set is obtained in advance through system information block (SIB) signaling broadcast of a base station or according to a protocol.

3. The method according to claim 1, wherein the sending a second user equipment a control signaling carrying the configuration information comprises:
sending the second user equipment the set version identifier and the DRX parameter identifier.

4. The method according to claim 1, wherein the DRX parameter comprises a priority rule for sending data.

5. The method according to claim 1, wherein the sending a second user equipment a control signaling carrying the configuration information comprises:
sending the second user equipment radio resource control (RRC) signaling carrying the configuration information.

6. The method according to claim 1, wherein the sending a second user equipment a control signaling carrying the configuration information comprises:
repeatedly sending the second user equipment the control signaling carrying the configuration information.

7. A terminal device, wherein the terminal device is a first user equipment, and the terminal device comprises a processor, a memory, and a computer program stored in the memory and executable on the processor; and the computer program, when executed by the processor, causes the first user equipment to perform:
receiving configuration information sent by a base station to which the first user equipment belongs, the configuration information comprising a discontinuous reception (DRX) parameter identifier;
specifying a group of DRX parameters from a configured DRX parameter set according to the DRX parameter identifier; and
sending a second user equipment a control signaling carrying configuration information, wherein the configuration information is used to configure a DRX parameter;

wherein the computer program, when executed by the processor, causes the first user equipment to further perform:

reporting a service parameter or power saving requirements to a base station to which the first user equipment belongs;

wherein the configuration information further comprises a set version identifier, and an execution condition for the specifying the group of DRX parameters from the configured DRX parameter set according to the DRX parameter identifier is:

an issued set version identifier being consistent with a pre-stored set version identifier.

8. A method for configuring a DRX parameter for a Sidelink, performed by a second user equipment and comprising:

receiving a control signaling sent by a first user equipment, wherein the control signaling carries configuration information, and the configuration information comprises a discontinuous reception (DRX) parameter identifier; and configuring a group of DRX parameters associated with the DRX parameter identifier if a pre-obtained DRX parameter set contains a group of DRX parameters associated with the DRX parameter identifier;

wherein the configuration information further comprises a set version identifier, and if the pre-obtained DRX parameter set contains the group of DRX parameters associated with the DRX parameter identifier, an execution condition for configuring the group of DRX parameters associated with the DRX parameter identifier is: a received version identifier being consistent with a pre-stored version identifier.

9. The method for configuring a DRX parameter for a Sidelink according to claim 8, wherein the control signaling carrying the configuration information is continuously monitored, if the pre-obtained DRX parameter set does not contain a group of DRX parameters associated with the DRX parameter identifier.

10. The method for configuring a DRX parameter for a Sidelink according to claim 8, wherein a DRX parameter set is removed if a time for storing the DRX parameter set exceeds a set time.

11. The method for configuring a DRX parameter for a Sidelink according to claim 8, wherein the receiving a control signaling sent by a first user equipment comprises:
repeatedly receiving the control signaling sent by the first user equipment.

12. The method for configuring a DRX parameter for a sidelink according to claim 8, wherein the pre-obtained DRX parameter set is obtained in advance through SIB signaling broadcast of a base station or according to a protocol.

13. The method for configuring a DRX parameter for a sidelink according to claim 8, wherein the DRX parameter comprises a priority rule for sending data.

14. The method for configuring a DRX parameter for a sidelink according to claim 8, wherein the receiving control signaling sent by a first user equipment comprises: receiving radio resource control (RRC) signaling carrying configuration information and sent by the first user equipment.

15. The terminal device according to claim 7, wherein the configured DRX parameter set is obtained in advance through system information block (SIB) signaling broadcast of a base station or according to a protocol.

16. The terminal device according to claim 7, wherein the computer program, when executed by the processor, causes the first user equipment to perform:
sending the second user equipment the set version identifier and the DRX parameter identifier.

17. The terminal device according to claim 7, wherein the DRX parameter comprises a priority rule for sending data.

* * * * *